United States Patent [19]

Nakamura

[11] Patent Number: 4,900,164
[45] Date of Patent: Feb. 13, 1990

[54] AXIAL RETAINER FOR A CUTTER IN A ROTARY DRILL BIT

[75] Inventor: Osamu Nakamura, Tokyo, Japan

[73] Assignee: Tsukamoto Seiki Co., Ltd., Tokyo, Japan

[21] Appl. No.: 162,676

[22] Filed: Feb. 25, 1988

[30] Foreign Application Priority Data

Nov. 17, 1987 [JP] Japan .................... 62-290360

[51] Int. Cl.⁴ .................... F16C 17/12; E21B 10/22
[52] U.S. Cl. .................... 384/96; 175/369
[58] Field of Search .......... 384/92, 95, 96, 903; 175/366, 369–371

[56] References Cited

U.S. PATENT DOCUMENTS

| | | | |
|---|---|---|---|
| 1,835,523 | 12/1931 | Reed | 175/366 |
| 1,865,706 | 7/1932 | Reed | 175/369 |
| 4,344,658 | 8/1982 | Lederwood, III | 384/96 |
| 4,444,518 | 4/1984 | Schramm et al. | 384/96 |
| 4,506,997 | 3/1985 | Schramm et al. | 384/96 |
| 4,511,008 | 4/1985 | Brunson | 175/369 |

FOREIGN PATENT DOCUMENTS 0108029  2/1984  European Pat. Off. ............ 384/96

Primary Examiner—Thomas R. Hannon
Attorney, Agent, or Firm—Wenderoth, Lind & Ponack

[57] ABSTRACT

A retainer for axially retaining a cutter on the journal pin of a rotary drill bit body includes a plurality of arcuate sliding keys and a single initial tensioning ring accommodated astride an annular groove formed in the peripheral outer wall surface of the journal pin and a corresponding annular groove formed in the inner peripheral wall surface of the cutter. When the cutter is mounted on the journal pin, the initial tensioning ring functions to urge the sliding keys into pressured contact with the cutter groove when the two grooves are in registration. Not only is assembly facilitated, but damage to the sliding keys that might otherwise be caused by any excessive axially directed force applied to the sliding keys during operation of the drill bit is prevented by allowing the sliding keys to recede within the annular groove of the journal pin.

2 Claims, 4 Drawing Sheets

AXIAL RETAINER FOR A CUTTER IN A ROTARY DRILL BIT

BACKGROUND OF THE INVENTION

This invention relates to a rotary drill bit used in drilling for oil, iron ore and coal or in drilling operations for geothermal power generation.

In a rotary drill bit of the type described, a cutter is fitted onto the journal pin of a leg extending from the bit body. It is essential that means be provided for retaining the cutter on the journal pin so that the cutter will not undergo displacement axially of the journal, namely along the axis of cutter rotation. An example of such retention means is disclosed in the specification of U.S. Pat. No. 4,444,518. In one arrangement, a garter spring is brought into wrapping engagement with a plurality of segmented rings to engage the segmented rings with a groove in the cutter and a groove in the journal pin when these two grooves are registered with each other. In an alternative arrangement, the garter spring is replaced by leaf springs secured to the outer face of respective ones of he segmented rings to engage the segmented rings with the aforementioned grooves in a similar manner.

The specifications of U.S. Pat. Nos. 4,236,764 and 4,511,008 disclose arrangements in which only a snap ring is accommodated so as to bridge the cutter groove and journal pin groove to retain the cutter in the axial direction.

A number of problems are encountered in the prior art mentioned above. Specifically, in the arrangement where the garter spring is used, spring durability declines due to the extremely harsh conditions under which the drill bit is used. In the arrangement that relies upon the leaf springs secured to the segmented rings, the leaf springs and segmented rings tend to separate from each other owing to a concentration of stress produced at the spring-ring joints by repetitive application of lateral force. In addition, the segmented rings are fitted into the grooves so as not to readily move in the axial direction in order to prevent the cutter from undergoing conical motion. Consequently, fragments of metal are produced (a phenomenon referred to as "spalding") due to friction among the component parts during operation of the drill bit, and the metal fragments cause an O-ring on the journal pin to become flawed and scored. The end result is that the sealing capability of the O-ring diminishes in a short period of time. Even if the drawback of spalding can be alleviated to some extent, the segmented rings undergo almost no movement axially of the cutter. In consequence, an axially directed breaking force applied to the segmented rings acts upon the rings directly and without mitigation. The segmented rings therefore are likely to break or become damaged. This tendency makes it difficult to avoid a rapid end to the service life of the bit.

In the arrangement using the snap ring as the axial retention means, the effects of the strong lateral force and axially directed breaking force mentioned above appear and make it difficult to prolong bit lifetime.

SUMMARY OF THE INVENTION

Accordingly, an object of the present invention is to provide an axial retainer for a cutter in a rotary drill bit which not only improves the durability of the journal pin but is also composed of component parts that can be installed very easily to simplify the assembly of the cutter and enhance reliability.

According to the present invention, the foregoing object is attained by providing a retainer for axial retention of a cutter on a rotary drill bit having a bit body provided with a journal pin on which the cutter is rotatably mounted, the journal pin having a first annular groove formed in an outer peripheral wall surface thereof, and the cutter having a second annular groove corresponding to the first annular groove formed in an inner peripheral wall surface thereof, the first and second annular grooves being substantially registered when the cutter is mounted on the journal pin, the retainer comprising a plurality of sliding keys accommodated in the first annular groove, and an initial tensioning ring accommodated in the first annular groove in a compressed state inwardly of the sliding keys, the second annular groove receiving the sliding keys when the first and second grooves substantially register, thereby allowing the initial tensioning ring to assume an expanded state.

In a characterizing feature of the invention, when the initial tensioning ring expands in the first annular groove, the plurality of sliding rings are urged toward the second annular groove by the initial tensioning ring. Each of the sliding keys has an outermost side defining a circular arc the diameter whereof coincides with an inner diameter of an inner surface of the second annular groove.

In a further characterizing feature of the invention, the second annular groove has a shoulder portion and the first annular groove is formed to include an inclined surface portion corresponding to the shoulder portion, slight displacement of the sliding keys axially of the journal pin being guided and then limited by the shoulder portion and the inclined surface portion.

In the cutter retainer according to the invention, the plurality of sliding keys and the initial tensioning ring applying a force that urges the sliding keys radially outwardly are accommodated within the annular groove of the journal pin. When the cutter is being moved axially of the journal pin in order to be fitted onto the journal pin, the sliding keys are urged radially outward by the initial tensioning ring toward the groove in the cutter wall corresponding to the annular groove in the journal bit. When the two grooves register, the sliding keys come into intimate contact with the inner surface of the cutter groove. Thus, the sliding keys are merely in pressured contact with the initial tensioning ring inside the grooves and are maintained in a state free of internal stress both during the process of fitting the cutter onto the journal pin and after this process is completed. When a thrust load acts in a direction that attempts to dislodge the cutter from the journal pin during operation of the rotary bit, axial displacement of the sliding keys is at first permitted and then checked by the shoulder portion of the cutter groove and the inclined surface portion of the journal pin groove. The cutter is retained on the journal pin without axial displacement by virtue of this buffering process.

In the cutter retainer according to the invention, the sliding keys are for the most part not subjected to the lateral forces and axially directed breaking force which act in the prior art and therefore make it possible for the drill bit to operate in a state free of internal stress. Consequently, damage to the O-ring between the journal pin and cutter caused by spalding is eliminated, with an attendant improvement in the durability of the journal. The initial tensioning ring is simple in construction and possessed of both rigidity and flexibility. Assembly is achieved merely by sinking the initial tensioning ring and the plurality of sliding keys in the annular groove of the journal pin and then pressing the cutter onto the journal pin. Thus, assembly is simplified greatly by virtue of a reduced number of component parts.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The drawings illustrate an embodiment of means for axially retaining the cutter of a rotary drill bit in accordance with the present invention, in which.

DESCRIPTION OF THE PREFERRED EMBODIMENT

A preferred embodiment of the present invention will now be described in detail with reference to FIGS. 1 through 7.

Figure 1:
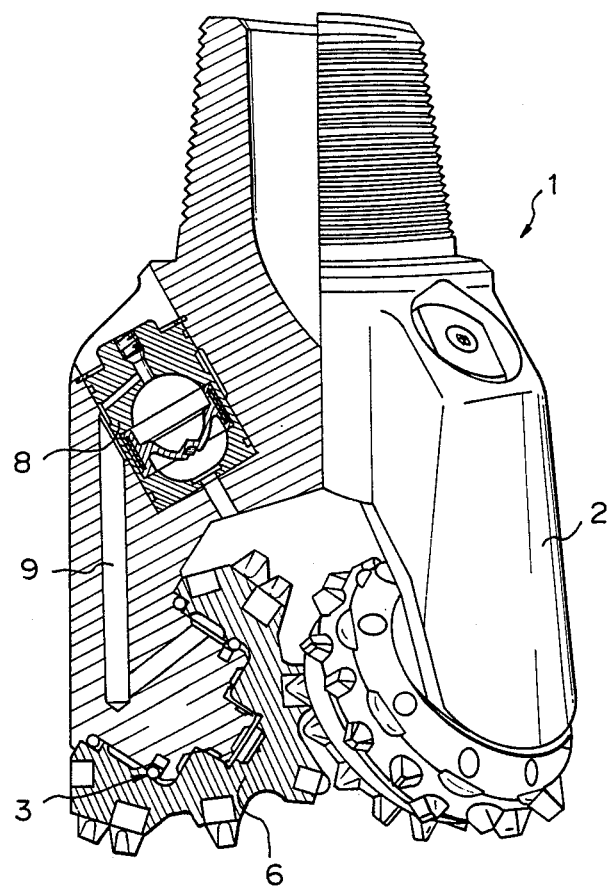
FIG. 1 is a side elevational view, partially in section, illustrating a portion of a rotary drill bit.
Figure 2:
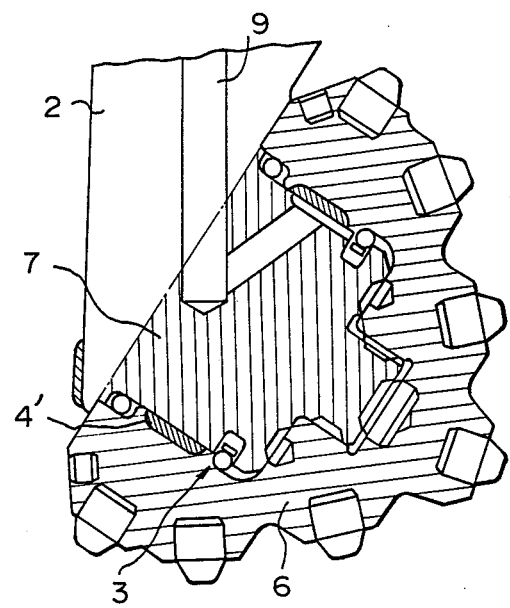
FIG. 2 is an enlarged longitudinal sectional view illustrating the drill bit.

As shown in FIGS. 1 and 2, a drill bit 1 includes a bit leg 2 provided with a journal pin 7 extending from the bit leg, a conical cutter 6 fitted onto the journal pin 7, and a retainer 3 for retaining the cutter 6 on the journal pin 7 so that the cutter 6 will not undergo displacement axially of the journal pin 7. The retainer 3 is provided at a position located between the distal end of the journal pin 7 and the bottom face of the cutter 6 and lubricated by grease from a pressure compensator 8 and lubricating passageway 9. Imbedded in the inner peripheral surface of the cutter 6 is a continuous or segmented hard metal 4'.

Figure 3:
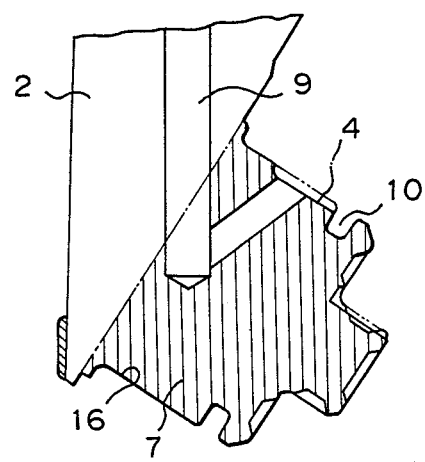
FIG. 3 is a longitudinal sectional view of a journal pin illustrating an annular groove formed in the outer wall of the journal pin.
Figure 4:
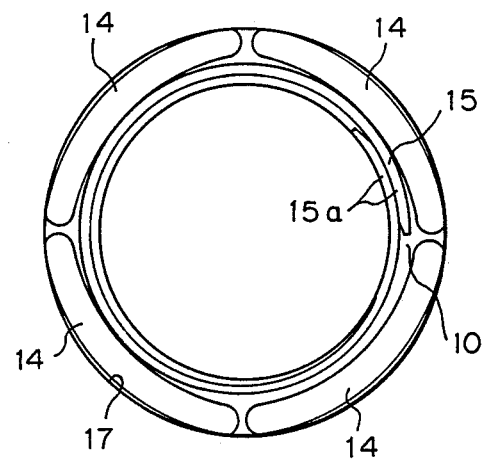
FIG. 4 is a plan view showing the relationship between sliding keys and an initial tensioning ring in a compressed state.
Figure 5:
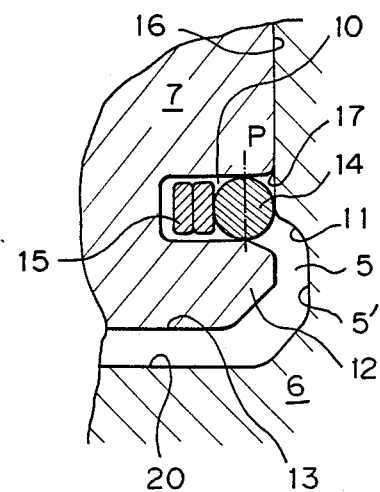
FIG. 5 is a partially enlarged longitudinal sectional view showing the state illustrated in FIG. 4.
Figure 6:
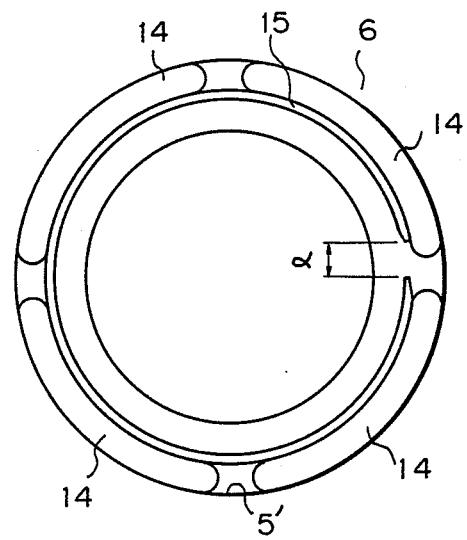
FIG. 6 is a plan view showing the relationship between the initial tensioning ring in an expanded state and the sliding keys.
Figure 7:
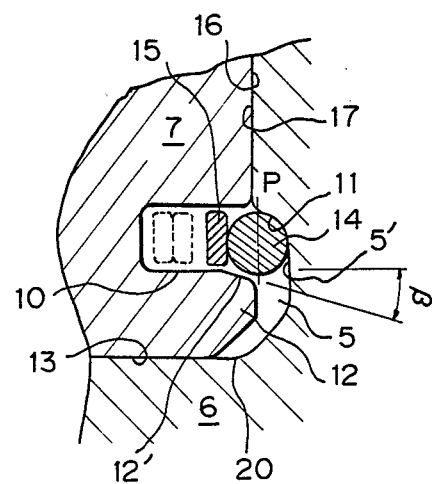
FIG. 7 is a partially enlarged longitudinal sectional view showing the state illustrated in FIG. 6.

As shown in FIG. 3, the journal pin 7 has an outer peripheral surface 16 formed to include a grease reservoir 4, which communicates with the lubricating passageway 9, and an annular groove 10. As illustrated in FIGS. 4 through 7, four generally arcuate sliding keys 14, each having a circular transverse cross section, and one initial tensioning ring 15 having a rectangular cross section are fitted into the annular groove 10. During assembly, the initial tensioning ring 15 is urged inwardly of the groove 10 by an inner wall 17 of the cutter 6, with both ends 15a of the ring 15 overlapping each other, while the sliding keys 14 contact the surface of the inner wall 17, as clearly shown in FIGS. 4 and 5. This is the state that prevails just before the cutter 6 has been fitted fully onto the journal pin 7 by being pushed onto the pin axially thereof. When the fitting of the cutter 6 onto the journal pin 7 has been completed, as shown in FIGS. 6 and 7, the ends 15a of the initial tensioning ring 15 part from each other by a distance a, as a result of which the sliding keys 14 are urged radially outwardly in such a manner that the arcuate outer surfaces thereof are brought into snug, intimate contact with an inner surface 5' of an annular groove 5 formed in the inner wall 17 of cutter 6. At this time the sliding keys 14 are fixedly embraced by a shoulder 11 of the cutter groove 5 and an inclined portion 12' defining an angle $\beta$ with the outer edge of the annular groove 10 on the distal end side of the journal pin 7, whereby the sliding keys 14 lock the cutter 6 and journal pin 7 together against movement in the axial direction (see FIG. 7).

The sliding keys 14 are made of spring steel, tool steel, a copper-aluminum alloy or the like, and the transverse cross sectional thereof may be elliptical or polygonal in addition to the circular configuration mentioned above. It is permissible for the sliding keys 14 and initial tensioning ring 15 to be made of the same material. Preferably, the sliding keys 14 are tempered in order to improve their hardness and subjected to a heat treatment such as Parkerizing and a surface treatment such as Moly Kote coating in order to lower their coefficient of friction.

The spring steel of the tensioning ring 15 is tempered to provide the ring with a satisfactory spring property, and the natural diameter of the ring 15 is made to be slightly larger than the set diameter which will prevail when assembly of the cutter 6 on the journal pin 7 is completed. As shown in FIG. 5, it is preferred that the depth of the annular groove 10 of journal pin 7 be great enough to assure that the sliding keys 14 will not sustain lateral forces and stress in the diametric direction even when they have receded to a point flush with an outer wall 16 of the journal pin 7 when urged inwardly by the inner wall 17 of the cutter 6, as shown in FIG. 5. Thus, the four sliding keys 14 constituting a single set are acted upon solely by the tensioning force of initial tensioning spring 15 both during the assembly of the cutter 6 (FIG. 5) and after the cutter 6 has been fitted on the journal pin 7 (FIG. 7), and they are not subjected to urging forces from the journal pin or from the cutter. As a result, the sliding keys are themselves maintained in a state free of internal stresses at all times. When a thrust load attempting to dislodge the cutter 6 from the journal pin 7 is applied, the sliding keys 14 completely prevent the cutter 6 from coming off the journal pin 7 since the keys are clamped in the axial direction between the shoulder portion 11 and inclined portion 12', as set forth above.

As many apparently widely different embodiments of the present invention can be made without departing from the spirit and scope thereof, it is to be understood that the invention is not limited to the specific embodiment thereof except as defined in the appended claims.

What is claimed is:

1. A retainer for axial retention of a cutter on a rotary drill bit having a bit body provided with a journal pin on which the cutter is rotatably mounted, the journal pin having a first annular groove formed in an outer peripheral wall surface thereof, a portion of one wall of said groove adjacent said outer peripheral wall forming an inclined surface portion, and the cutter having a second annular groove corresponding to said first annular groove formed in an inner peripheral wall surface thereof, said second annular groove including a shoulder portion corresponding to, and in spaced substantially opposed relation with, said inclined surface portion, said first and second annular grooves being substantially registered when the cutter is mounted on the journal pin, said retainer comprising:
- a plurality of sliding keys accommodated in said first annular groove; and
- an initial tensioning ring accommodated in said first annular groove in a compressed state inwardly of said sliding keys;
- said second annular groove receiving said sliding keys when said first and second grooves substantially register, thereby allowing said initial tensioning ring to assume an expanded state to urge said plurality of sliding keys toward said second annular groove, and displacement of said sliding keys axially of said journal pin being guided and limited by said shoulder portion and said inclined surface portion.

2. The retainer according to claim 1, wherein each of said sliding keys has an outermost side defining a circular arc the diameter whereof coincides with an inner diameter of an inner surface of said second annular groove.

* * * * *